S. M. LEE.
CAR BRAKE.

No. 80,290. Patented July 28, 1868.

Witnesses:
Jacob Henry
Louis Bodhal

Inventor:
Samuel M. Lee
By Niederhein & Co.
Attys.

United States Patent Office.

SAMUEL M. LEE, OF NEW LONDON, IOWA.

*Letters Patent No. 80,290, dated July 28, 1868.*

IMPROVED CAR-BRAKE.

*The Schedule referred to in these Letters Patent and making part of the same.*

TO ALL WHOM IT MAY CONCERN:

Be it known that I, SAMUEL M. LEE, of New London, in the county of Henry, and State of Iowa, have invented a new and useful Improvement in Self-Acting Railroad-Car Brakes; and I do hereby declare the following to be a full and correct description thereof, sufficient to enable others skilled in the art to which my invention appertains to fully understand its construction and operation, reference being had to the accompanying drawings, which make part of this specification, and in which—

Figure 1:
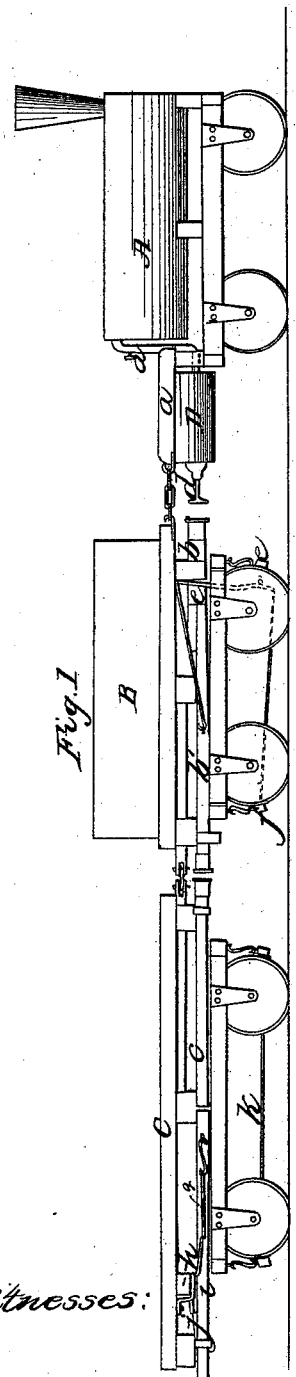

Figure 1 is a side elevation of a train, and

Figure 2:
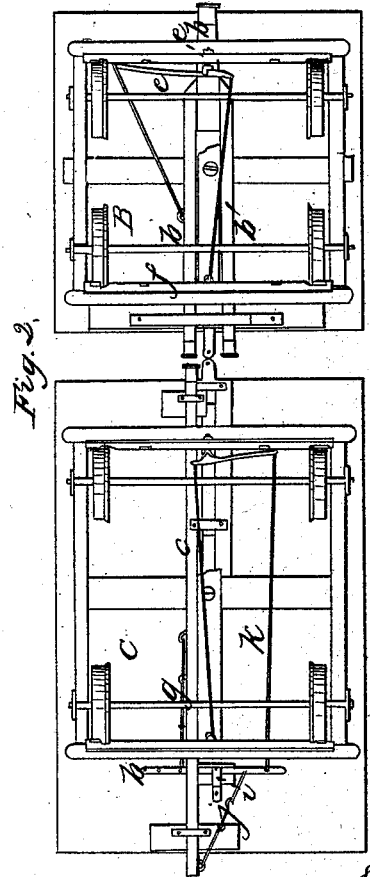

Figure 2 a bottom view of the tender and one car provided with my improved brake.

Like letters indicate like parts in both figures.

The self-acting car-brake, heretofore patented require considerable alterations in the cars to which they are to be attached, and are in themselves so complicated as to make it a matter of so great expense to apply them, they getting very often out of order, that it is no advantage to the railroad-companies to buy the right to apply them.

My improved brake-device can be attached to any car now in use on any railroad, without the necessity of changing the brake-gear on them, and consists in the attachment of the brake in a peculiar manner to a brake-bar running under the car, from end to end, in a line parallel to but not in the centre line of its bottom, said brake-bars being operated by a cylinder placed under the foot-board of the locomotive-engine in such a manner that the engineer can set and release the brakes at will.

A, in the drawings, may represent the locomotive,

B the tender, and

C one truck of a passenger or freight-car of train.

Under the foot-board $a$ of the locomotive is arranged a cylinder, D, the piston $d$ of which operates on the brake-bar $b$ of the tender, and is connected with the steam in the boiler by a pipe, $a'$.

On the under side of the bottom of the tender B, a forked brake-bar, $b$, operates in proper bearings, the space between the forks $b'$ of which is in the centre of the bottom of the tender.

The brake across bar $e$ has pivoted to it a lever, $e'$, one end of which is connected to one of the forks $b'$, while the other is connected to the other brake cross-bar $f$.

On the under side of the bottom of the truck C is a brake-bar, $c$, sliding in proper bearings, in such a manner as to correspond with either fork $b'$ of the brake-bar $b$, according to the position the car occupies to the tender. To this bar is connected, by a chain, $g$, one end of a lever, $h$, which is pivoted in the centre of the under side of the car, as shown at $i$, and the other end of which is again connected to the other side of the bar $b$ by a chain, $j$, and is also connected to the brake-gear of the truck by the rod $k$.

The brake-bars $b$ $c$ are of such length only as not to touch when the bumpers meet in backing up the train, and extends the whole length of the cars, one bar operating the brake-gears of both trucks of the same car.

Its operation is very simple. When it is desired to set the brakes up, the engineer admits steam into the cylinder D, thus forcing the piston back on the brake-bar $b$ of the tender, one of the forks $b'$ of which again acts on the bar $c$ of the car, and so on from car to car, so that all brakes are set simultaneously and instantaneously. The engineer can, of course, graduate the degree of pressure to be exerted on the brakes by the amount of steam let into the cylinder D, which latter is properly provided with exhaust-pipes, &c.

It will be easily seen that by the peculiar attachment of the brake-bar $c$ to the lever $h$, the brake-gear can be operated the same, no matter what end of the car is next to the tender.

Cars are hardly ever changed end for end on the track, but the locomotive and tender are, and for that reason I employ the forked arms $b'$ of the brake-bar $b$.

It will be seen that this brake-device is very easily attached to any car now in use, and can be constructed at very little cost.

I am aware that it is not new to operate brakes by means of a piston and sliding rods with intermediate levers. Such parts I do not, therefore, claim; but having thus described my invention,

What I claim as new, and desire to secure by Letters Patent, is—

In combination with an independent piston, $d$, the arrangement of a forked bar, $b$, with the tender, and a single bar, $c$, with the car, for operating said bar $c$ at either end, substantially as and for the purpose described.

To the above I have signed my name, this 28th day of February, 1868.

SAMUEL M. LEE.

Witnesses:
 HUGH W. TEMPLIN,
 P. N. BOWMAN.